(12) United States Patent
Nonnet

(10) Patent No.: US 12,325,665 B2
(45) Date of Patent: Jun. 10, 2025

(54) SINTERED ALUMINA-ZIRCONIA BALLS

(71) Applicant: SAINT-GOBAIN CENTRE DE RECHERCHES ET D'ETUDES EUROPEEN, Courbevoie (FR)

(72) Inventor: Emmanuel Nonnet, Saint Saturnin lès Avignon (FR)

(73) Assignee: SAINT-GOBAIN CENTRE DE RECHERCHES ET D'ETUDES EUROPEAN, Courbevoie (FR)

( * ) Notice: Subject to any disclaimer, the term of this patent is extended or adjusted under 35 U.S.C. 154(b) by 982 days.

(21) Appl. No.: 17/423,431

(22) PCT Filed: Jan. 17, 2020

(86) PCT No.: PCT/EP2020/051178
§ 371 (c)(1),
(2) Date: Jul. 15, 2021

(87) PCT Pub. No.: WO2020/148446
PCT Pub. Date: Jul. 23, 2020

(65) Prior Publication Data
US 2022/0153650 A1 May 19, 2022

(30) Foreign Application Priority Data
Jan. 18, 2019 (FR) ...................... 1900449

(51) Int. Cl.
*C04B 35/488* (2006.01)
(52) U.S. Cl.
CPC .. *C04B 35/4885* (2013.01); *C04B 2235/3208* (2013.01); *C04B 2235/3217* (2013.01); *C04B 2235/3225* (2013.01); *C04B 2235/3244* (2013.01); *C04B 2235/3418* (2013.01); *C04B 2235/762* (2013.01); *C04B 2235/765* (2013.01)
(58) Field of Classification Search
CPC ........ C04B 35/4885; C04B 2235/3208; C04B 2235/3217; C04B 2235/3225; C04B 2235/3244; C04B 2235/3418; C04B 2235/762; C04B 2235/765
See application file for complete search history.

(56) References Cited

U.S. PATENT DOCUMENTS

| | | | |
|---|---|---|---|
| 5,502,012 A * | 3/1996 | Bert | ........................ B02C 17/20 501/103 |
| 6,905,993 B2 | 6/2005 | Sakuta et al. | |

FOREIGN PATENT DOCUMENTS

| | | |
|---|---|---|
| FR | 2882749 A1 | 9/2006 |
| WO | 2015055950 A1 | 4/2015 |
| WO | WO-2016008967 A1 * | 1/2016 ............. B02C 23/00 |

OTHER PUBLICATIONS

International Search Report corresponding to International Application No. PCT/EP2020/051178 dated Mar. 31, 2020, 6 pages.
Xin Guo, et al., "Hydrothermal degradation of cubic zirconia", Acta Materialia., GB, vol. 51, No. 17, Oct. 2003, pp. 5123-5130.

* cited by examiner

Primary Examiner — Bryan D. Ripa
Assistant Examiner — Cameron K Miller
(74) Attorney, Agent, or Firm — Ronald M. Kachmarik; Cooper Legal Group LLC

(57) ABSTRACT

Sintered bead that has a crystalline composition, as percentages by weight based on the total weight of the crystalline phases: zircon<25%; 50%≤cubic zirconia+tetragonal zirconia≤95%, the cubic zirconia content being greater than 50%, the cubic zirconia content being the (cubic zirconia/(cubic zirconia+tetragonal zirconia) ratio by weight); 0≤monoclinic zirconia≤(10−0.2*tetragonal zirconia) %; 5%≤corundum≤50%; crystalline phases other than zircon, cubic zirconia, tetragonal zirconia, monoclinic zirconia and corundum<10%; and the following chemical composition, as percentages by weight based on the oxides: 34%≤$ZrO_2$+$HfO_2$, $ZrO_2$+$HfO_2$ being the remainder to 100%; $HfO_2$≤4.0%; 0.5%≤$SiO_2$≤14.1%; 4.5%≤$Al_2O_3$≤49.6%; 2.75%≤$Y_2O_3$≤22.8%; MgO≤5%; CaO≤2%; oxides other than $ZrO_2$, $HfO_2$, $SiO_2$, $Al_2O_3$, MgO, CaO and $Y_2O_3$<5.0%.

20 Claims, No Drawings

SINTERED ALUMINA-ZIRCONIA BALLS

TECHNICAL FIELD

The present invention relates to sintered alumina-zirconia beads, to a process for the manufacture of these beads, and to the use of these beads as grinding agents, dispersing agents in wet media or for surface treatment.

PRIOR ART

The paint, ink, dye, magnetic lacquer or agrochemical compound industries use beads for the dispersion and homogenization of liquid and solid constituents.

The mineral industry employs beads for the fine grinding of materials optionally preground dry by conventional processes, in particular for the fine grinding of calcium carbonate, titanium dioxide, gypsum, kaolin and iron ore.

In the field of microgrinding, sand with rounded particles, glass beads, metal beads and ceramic beads are known.

Sand with rounded particles, such as Ottawa sand, for example, is a natural and inexpensive product but is unsuitable for modern, pressurized and high-throughput grinding mills. This is because sand is not very strong, has a low density, is variable in quality and is abrasive to the equipment.

Glass beads, which are widely used, exhibit a better resistance, a lower abrasiveness and are available in a wider range of diameters.

Metal beads, in particular of steel, exhibit a low inertness with respect to the products treated, resulting in particular in contamination of mineral fillers and greying of paints, and an excessively high density requiring special grinding mills. They involve in particular a high energy consumption, significant heating and high mechanical stressing of the equipment.

Ceramic beads have a better resistance than glass beads, a higher density and an excellent chemical inertness.

The beads conventionally exhibit a size of between 0.005 and 10 mm.

The following can be distinguished:

fused ceramic beads, generally obtained by melting of ceramic components, formation of spherical drops from the molten material and then solidification of said drops, and sintered ceramic beads, generally obtained by cold forming of a ceramic powder and then consolidation by firing at high temperature.

Unlike sintered beads, fused beads most often comprise a very extensive intergranular glassy phase which fills a network of crystallized grains. The problems encountered in their respective applications by sintered beads and by fused beads, and the technical solutions adopted in order to solve them, are thus generally different. Moreover, due to the major differences between the manufacturing processes, a composition developed for manufacturing a molten bead is not suitable, a priori, for manufacturing a sintered bead, and vice versa.

A very specific application is the use of beads as grinding medium, in particular for finely grinding mineral, inorganic or organic materials. In this application, the beads are dispersed in an aqueous medium or a solvent, the temperature of which can exceed 80° C., while remaining preferably below 150° C., and undergo frictional actions by contact with the material to be ground, by mutual contact and by contact with the parts of the grinding mill. The lifetime of the beads then depends directly on their wear resistance in this aqueous medium or solvent.

In order to increase the yields of the grinding operations, the grinding beads have to be more and more resistant to wear, while exhibiting a high resistance to degradation in a hot liquid medium, in particular when they are in contact with water at more than 80° C., these conditions being referred to below as "hydrothermal conditions".

Alumina-zirconia grinding beads are known, the zirconia being stabilized in the tetragonal crystallographic form. These beads exhibit good wear resistance. However, their resistance under hydrothermal conditions is limited.

There exists a need for alumina-zirconia beads exhibiting improved resistance under hydrothermal conditions, without substantial deterioration in the wear resistance.

An aim of the invention is to meet this need, at least partially.

DISCLOSURE OF THE INVENTION

Summary of the Invention

The invention relates to a sintered bead, exhibiting:
the following crystalline phases, as percentages by weight based on the crystalline phases present and for a total of 100%:
zircon<25%;
50%≤cubic zirconia+tetragonal zirconia≤95%, the cubic zirconia level being greater than 50%;
0≤monoclinic zirconia≤(10−0.2*tetragonal zirconia) %;
5%≤corundum≤50%;
crystalline phases other than zircon, cubic zirconia, tetragonal zirconia, monoclinic zirconia and corundum<10%;
the following chemical composition, as percentages by weight based on the oxides:
34%≤$ZrO_2$+$HfO_2$, $ZrO_2$+$HfO_2$ being the remainder to 100%;
$HfO_2$≤4.0%;
0.5% $SiO_2$≤14.1%;
4.5%≤$Al_2O_3$≤49.6%;
2.75%≤$Y_2O_3$≤22.8%;
MgO≤5%;
CaO≤2%;
oxides other than $ZrO_2$, $HfO_2$, $SiO_2$, $Al_2O_3$, MgO, CaO and $Y_2O_3$<5.0%.

As will be seen in more detail in the continuation of the description, the inventors have discovered that this combination of characteristics considerably improves the resistance under hydrothermal conditions. Unexpectedly, they have also found that the planetary wear resistance remained substantially identical to that of the sintered beads of the state of the art. This discovery is surprising because it was commonly accepted that the presence of cubic zirconia has a very detrimental effect on the wear resistance, as described, for example, in U.S. Pat. No. 6,905,993.

The sintered beads according to the invention are thus particularly well suited to applications of dispersion in a wet medium, of microgrinding, of heat exchange and of surface treatment.

A sintered bead according to the invention can also exhibit one or more of the following optional characteristics:
the zircon content is less than 24%, as percentages by weight based on the crystalline phases;
the cubic+tetragonal zirconia content is less than 90%, as percentages by weight based on the crystalline phases;

the cubic zirconia level is greater than 60%, as percentages by weight based on the crystalline phases;

the monoclinic zircon content is less than 8%, preferably is substantially zero, as percentages by weight based on the crystalline phases;

the corundum content is greater than 8% and/or less than 45%, preferably less than 35%, as percentages by weight based on the crystalline phases;

the content of crystalline phases other than zircon, cubic zirconia, tetragonal zirconia, monoclinic zirconia and corundum is less than 8%, as percentages by weight based on the crystalline phases;

the $ZrO_2+HfO_2$ content is greater than 37.0%, preferably greater than 44.6%, and/or less than 85.0%, preferably less than 75.0%, as percentages by weight based on the oxides;

the $HfO_2$ content is less than 3.0%, preferably less than 2.0%, as percentages by weight based on the oxides;

the $SiO_2$ content is greater than 1.0%, preferably greater than 2.0%, and/or less than 13.6%, preferably less than 12.0%, as percentages by weight based on the oxides;

the $Al_2O_3$ content is greater than 7.0%, preferably greater than 10.5%, and/or less than 45.0%, preferably less than 34.9%, as percentages by weight based on the oxides;

the $Y_2O_3$ content is greater than 2.8%, preferably greater than 3.6%, and/or less than 21.6%, preferably less than 18.0%, as percentages by weight based on the oxides;

the MgO content is greater than 0.1%, preferably greater than 0.15%, and/or less than 4.0%, preferably less than 2.0%, as percentages by weight based on the oxides;

the Cao content is greater than 0.1%, preferably greater than 0.2%, and/or less than 1.5%, preferably less than 1.0%, as percentages by weight based on the oxides;

the content of oxides other than $ZrO_2$, $HfO_2$, $SiO_2$, $Al_2O_3$, $Y_2O_3$, Cao and MgO is less than 4.0%, preferably less than 2.0%;

in one embodiment, the zircon content is greater than or equal to 10%, preferably greater than or equal to 15%, and less than 25%, preferably less than or equal to 20%; and the stabilized zirconia content is greater than 50% and less than 80%, preferably less than 70%, the cubic zirconia level being greater than 50%, preferably greater than 70%; and the monoclinic zirconia content is less than 5%, preferably substantially zero; and the corundum content is greater than 10%, preferably greater than 15%, and less than 35%, preferably less than 30%, preferably less than 28%, preferably less than 26%, preferably less than 25%; and the total content of crystalline phases other than zircon, stabilized zirconia, monoclinic zirconia and corundum is less than 6%; and the $ZrO_2+HfO_2$ content is greater than 43.5%, preferably greater than 56.0%, preferably greater than 57.0%, and less than 80.2%, preferably less than 72.0%; and the $HfO_2$ content is less than 4.0%, preferably less than 3.0%; and the $SiO_2$ content is greater than 4.5%, preferably greater than 7.5%, and less than 13.6%, preferably less than 11.0%; and the $Al_2O_3$ content is greater than 10.5%, preferably greater than 12.0%, and less than 34.9%, preferably less than 32.0%, preferably less than 30.0%, preferably less than 28.0%, preferably less than 26.0%, preferably less than 25.0%, preferably less than 20.0%; and the $Y_2O_3$ content is greater than 2.8%, preferably greater than 4.5%, and less than 19.2%, preferably less than 13.0%; and the MgO content is greater than 0.1%, preferably greater than 0.15%, and less than 4.0%, preferably less than 2.0%; and the CaO content is greater than 0.1%, preferably greater than 0.3%, and less than 1.5%, preferably less than 1.0%; and the content of oxides other than $ZrO_2$, $HfO_2$, $SiO_2$, $Al_2O_3$, $Y_2O_3$, CaO and MgO is less than 4.0%, preferably less than 2.0%;

in one embodiment, the zircon content is less than 4%, preferably substantially zero; and the stabilized zirconia content is greater than 50%, preferably greater than 60%, and less than 90%, preferably less than 85%, the cubic zirconia level being greater than 50%, preferably greater than 70%; and the monoclinic zirconia content is less than 5%, preferably substantially zero; and the corundum content is greater than 10%, preferably greater than 15%, and less than 35%, preferably less than 30%, preferably less than 28%, preferably less than 26%, preferably less than 25%; and the total content of crystalline phases other than zircon, stabilized zirconia, monoclinic zirconia and corundum is less than 6%; and the $ZrO_2+HfO_2$ content is greater than 44.6%, preferably greater than 53.0%, preferably greater than 57.0%, and less than 82.9%, preferably less than 70.0%; and the $HfO_2$ content is less than 4.0%, preferably less than 3.0%; and the $SiO_2$ content is greater than 1.0%, preferably greater than 2.5%, and less than 6.1%, preferably less than 5.0%; and the $Al_2O_3$ content is greater than 10.5%, preferably greater than 20.0%, and less than 34.9%, preferably less than 30.0%, preferably less than 28.0%, preferably less than 26.0%, preferably less than 25.0%; and the $Y_2O_3$ content is greater than 3.6%, preferably greater than 5.5%, and less than 21.6%, preferably less than 14.0%; and the MgO content is greater than 0.1%, preferably greater than 0.15%, and less than 4.0%, preferably less than 2.0%; and the CaO content is greater than 0.1%, preferably greater than 0.3%, and less than 1.5%, preferably less than 1.0%; and the content of oxides other than $ZrO_2$, $HfO_2$, $SiO_2$, $Al_2O_3$, $Y_2O_3$, CaO and MgO is less than 4.0%, preferably less than 2.0%.

The invention also relates to a bead powder comprising more than 90%, preferably more than 95%, preferably substantially 100%, as percentages by weight, of beads according to the invention.

The invention also relates to a process for the manufacture of sintered beads according to the invention, comprising the following successive stages:

a) preparation of a particulate mixture exhibiting a median size of less than 0.6 μm and a composition suitable for obtaining, on conclusion of stage g), sintered beads according to the invention, the particulate mixture comprising more than 0.5% by weight of particles made of a glass containing $SiO_2$, and/or of silica particles, and/or of particles made of a glass-ceramic containing $SiO_2$, and/or of particles made of a compound comprising MgO and $SiO_2$, and/or of particles equivalent to these particles, b) optionally, drying said particulate mixture, c) preparation of a starting charge from said particulate mixture, which is optionally dried, d) shaping of the starting charge in the form of crude beads, e) optionally, washing, f) optionally, drying, g) sintering at a sintering temperature of greater than 1330° C. and of less than 1450° C., so as to obtain sintered beads.

A manufacturing process according to the invention can also exhibit one or more of the following optional characteristics:

in stage a), one or more powders of starting materials introduced into said particulate mixture are ground, preferably co-ground;

in stage a), the particulate mixture comprises a stabilized zirconia powder, in an amount by weight, based on the particulate mixture, of greater than 45% and less than 88%, more than 50% by weight of said stabilized zirconia powder being in the cubic form, said stabilized zirconia being at least in part, preferably completely, stabilized by means of $Y_2O_3$;

in one embodiment, in stage a), the particulate mixture comprises a zircon powder in an amount of greater than 9.1% and less than 24.5%; and a powder of zirconia stabilized with $Y_2O_3$ in an amount of greater than 45% and less than 78.4%, more than 50% by weight of the stabilized zirconia particles being in the cubic form; and a corundum powder in an amount of greater than 9.1% and less than 34.3%; and a silica powder in an amount of greater than 0.5% and less than 6%; and a cordierite powder in an amount of greater than 0.5% and less than 8%; and a clay powder in an amount of greater than 0.5% and less than 5%;

in one embodiment, in stage a), the particulate mixture comprises a powder of zirconia stabilized with $Y_2O_3$ in an amount of greater than 45% and less than 88%, more than 50% by weight of the stabilized zirconia particles being in the cubic form; and a corundum powder in an amount of greater than 9.1% and less than 34.3%; and a silica powder in an amount of greater than 0.5% and less than 6%; and a cordierite powder in an amount of greater than 0.5% and less than 8%; and a clay powder in an amount of greater than 0.5% and less than 5%;

one or more of the powders of the particulate mixture can be replaced, at least partially, by equivalent powders which result, in said beads, in the same constituents, in the same amounts, with the same crystallographic phases.

The invention finally relates to the use of a powder of beads according to the invention, in particular manufactured according to a process according to the invention, as grinding agents, in particular in a wet medium; dispersing agents in wet media; propping agents, in particular for preventing the closure of deep geological fractures created in the walls of an extraction well, in particular an oil well; heat-exchange agents, for example for fluidized beds; or for surface treatment.

DEFINITIONS

A sum of the contents of oxides or of crystalline phases (that is to say, a formula in which these contents are connected by the sign "+") does not imply that the two oxides or crystalline phases connected by this sign "+" are necessarily simultaneously present.

The term "particle" is understood to mean an individualized solid product in a powder.

The term "sintering" conventionally refers to the consolidation, by heat treatment at more than 1100° C., of a crude particle (granular agglomerate), with optionally partial or complete melting of some of its constituents (but not of all its constituents).

The term "bead" is understood to mean a particle exhibiting a sphericity, that is to say a ratio of its smallest Ferret diameter to its largest Ferret diameter, of greater than 0.6, whatever the way by which this sphericity was obtained. Preferably, the beads according to the invention exhibit a sphericity of greater than 0.7.

The term "size" of a bead refers to its smallest Ferret diameter.

The term "median size" of a powder of particles of starting material or of a particulate mixture, generally denoted $D_{50}$, refers to the size dividing the particles of this powder or of this particulate mixture into first and second populations equal in weight, these first and second populations comprising only particles exhibiting a size of greater, or less respectively, than the median size. The median size can, for example, be evaluated using a laser particle size analyzer.

The term "sintered bead" is understood to mean a solid bead obtained by sintering a crude bead.

The term "impurities" is understood to mean the inevitable constituents necessarily introduced with the starting materials. In particular, in one embodiment, the compounds forming part of the group of the oxides, nitrides, oxynitrides, carbides, oxycarbides and carbonitrides of sodium and other alkali metals, iron, vanadium and chromium are impurities. Mention may be made, by way of examples, of $Fe_2O_3$ or $TiO_2$. The residual carbon forms part of the impurities of the composition of the beads according to the invention.

When reference is made to $ZrO_2$ or to ($ZrO_2+HfO_2$), this should be understood as meaning $ZrO_2$ and a small amount, typically less than 4.0%, of $HfO_2$, as percentage by weight based on $ZrO_2+HfO_2$. This is because a small amount of $HfO_2$, chemically inseparable from $ZrO_2$ and exhibiting similar properties, is always naturally present in sources of $ZrO_2$ at contents generally of less than 4.0%, as percentage by weight based on $ZrO_2+HfO_2$. $HfO_2$ is not regarded as an impurity.

For the sake of clarity, the terms "$ZrO_2$" (or "$ZrO_2+HfO_2$"), "$SiO_2$" and "$Al_2O_3$" are used to denote the contents of these oxides in the composition, and "zirconia", "silica" and "corundum" to denote crystalline phases of these oxides consisting of $ZrO_2+HfO_2$, $SiO_2$ and $Al_2O_3$, respectively. These oxides can, however, also be present in other phases. In particular, $ZrO_2$ and $SiO_2$ can be present as zircon ($ZrSiO_4$). The term "zirconia" conventionally includes the small amount of hafnia phase, not distinguishable by X-ray diffraction.

The term "stabilized zirconia" is understood to mean the assembly consisting of tetragonal zirconia and cubic zirconia.

The term "cubic zirconia level" refers to the (cubic zirconia/(cubic zirconia+tetragonal zirconia)) ratio by weight.

The term "powder of a compound" is understood to mean a powder comprising more than 95% by weight of particles comprising more than 90% by weight of said compound. Thus, a corundum powder comprises more than 95% by weight of particles comprising more than 90% by weight of corundum. A "cubic zirconia powder" comprises more than 95% by weight of particles comprising more than 90% by weight of cubic zirconia, the remainder preferably being monoclinic zirconia and/or tetragonal zirconia, preferably tetragonal zirconia. A "tetragonal zirconia powder" comprises more than 95% by weight of particles comprising more than 90% by weight of tetragonal zirconia. A "stabilized zirconia powder" comprises more than 95% by weight of particles comprising more than 90% by weight of stabilized zirconia.

All the percentages in the present description are percentages by weight based on the oxides, unless otherwise mentioned.

All the characteristics of the beads can be measured in accordance with the protocols described for the examples.

The expressions "containing a" or "comprising a" should be interpreted in a broad, nonlimiting manner, unless otherwise indicated.

DETAILED DESCRIPTION

Sintered Bead

A sintered bead according to the invention can exhibit one or more of the following optional characteristics:
- the zircon content, as percentage by weight based on the total amount of crystalline phases, is less than 24%, preferably less than 23%, preferably less than 22%;
- the content of cubic zirconia+tetragonal zirconia, as percentage by weight based on the total amount of crystalline phases, is less than 90%, preferably less than 85%;
- preferably, the cubic zirconia level is greater than 55%, preferably greater than 60%, preferably greater than 65%, preferably greater than 70%, preferably greater than 75%, preferably greater than 80%, indeed even greater than 85%, indeed even greater than 90%, indeed even greater than 95%;
- in one embodiment, the stabilized zirconia is present substantially only in the form of cubic zirconia;
- the monoclinic zirconia content, as percentage by weight based on the total amount of crystalline phases, is less than 8%, preferably less than 5%, preferably substantially zero;
- the corundum content, as percentage by weight based on the total amount of crystalline phases, is greater than 8%, preferably greater than 10%, preferably greater than 15%, and/or less than 45%, preferably less than 40%, preferably less than 35%, preferably less than 30%, preferably less than 28%, preferably less than 26%, preferably less than 25%;
- the total content of "other crystalline phases", that is to say of crystalline phases other than zircon, stabilized zirconia, monoclinic zirconia and corundum, as percentage by weight based on the total amount of crystalline phases, is less than 8%, preferably less than 6%, indeed even less than 5%, indeed even less than 4%;
- the "other crystalline phases" are, for more than 90%, more than 95%, substantially 100%, by weight, mullite and/or cristobalite;
- in one embodiment, the mullite content is not detectable with the measurement method described for the examples;
- the amount by weight of amorphous phase, that is to say vitreous phase, as percentage by weight with respect to the weight of the bead, is less than 10%, preferably less than 8%;
- the amorphous phase, expressed in an oxide form, comprises MgO and $SiO_2$, and/or $Y_2O_3$ and/or $Al_2O_3$ and/or CaO and/or $Na_2O$ and/or $K_2O$ and/or $P_2O_5$;
- the amorphous phase, expressed in an oxide form, comprises MgO and $SiO_2$ and $Y_2O_3$ and $Al_2O_3$ and $Na_2O$ and $K_2O$ and $P_2O_5$;
- the content of $ZrO_2+HfO_2$ is greater than 37.0%, preferably greater than 40.0%, preferably greater than 43.5%, preferably greater than 44.6%, preferably greater than 46.0%, preferably greater than 50.0%, preferably greater than 53.0%, preferably greater than 56.0%, preferably greater than 57.0%, and/or less than 85.0%, preferably less than 82.9%, preferably less than 80.2%, preferably less than 75.0%, preferably less than 72.0%, as percentages by weight based on the oxides;
- the $HfO_2$ content is less than 3.0%, preferably less than 2.0%, as percentages by weight based on the oxides;
- the $SiO_2$ content is greater than 1.0%, preferably greater than 1.3%, preferably greater than 2.0%, preferably greater than 2.5%, indeed even greater than 4.5%, indeed even greater than 6.0%, and/or less than 13.6%, preferably less than 12.0%, preferably less than 11.0%, as percentages by weight based on the oxides;
- the $Al_2O_3$ content is greater than 7.0%, preferably greater than 10.5%, preferably greater than 12.0%, and/or less than 45.0%, preferably less than 40.0%, preferably less than 34.9%, preferably less than 32.0%, preferably less than 30.0%, preferably less than 28.0%, preferably less than 26.0%, preferably less than 25.0%, as percentages by weight based on the oxides;
- the $Y_2O_3$ content is greater than 2.8%, preferably greater than 3.0%, preferably greater than 3.6%, preferably greater than 4.0%, preferably greater than 4.5%, and/or less than 21.6%, preferably less than 20.0%, preferably less than 19.2%, preferably less than 18.0%, preferably less than 16.0%, preferably less than 15.0%, preferably less than 14.0%, as percentages by weight based on the oxides;
- the MgO content is greater than 0.1%, preferably greater than 0.15%, indeed even greater than 0.2%, indeed even greater than 0.3%, and/or less than 4.0%, preferably less than 3.0%, preferably less than 2.0%, preferably less than 1.5%, preferably less than 1.0%, as percentages by weight based on the oxides;
- the CaO content is greater than 0.1%, preferably greater than 0.2%, preferably greater than 0.3%, and/or less than 1.5%, preferably less than 1.0%, as percentages by weight based on the oxides;
- the total content of oxides other than $ZrO_2$, $HfO_2$, $SiO_2$, $Al_2O_3$, $Y_2O_3$, CaO and MgO is less than 4.0%, preferably less than 3.0%, preferably less than 2.0%, indeed even less than 1.5%, indeed even less than 1.0%, as percentages by weight based on the oxides (preferably, the $Na_2O$ content is less than 0.8%, preferably less than 0.5%, preferably less than 0.3%, preferably less than 0.2%, and/or the $K_2O$ content is less than 0.8%, preferably less than 0.5%, preferably less than 0.3%, preferably less than 0.2%);
- oxides other than $ZrO_2$, $HfO_2$, $SiO_2$, $Al_2O_3$, $Y_2O_3$, CaO and MgO are impurities;
- preferably, any oxide other than $ZrO_2$, $HfO_2$, $SiO_2$, $Al_2O_3$, $Y_2O_3$, CaO and MgO is present in an amount of less than 2.0%, preferably less than 1.5%, preferably less than 1.0%, indeed even less than 0.8%, indeed even less than 0.5%, indeed even less than 0.3%;
- preferably, the content of oxides of a bead according to the invention represents more than 99%, preferably more than 99.5%, preferably more than 99.9% and more preferably substantially 100% of the total weight of said bead;
- the sintered bead exhibits a size of less than 10 mm, preferably less than 2.5 mm, and/or greater than 0.005 mm, preferably greater than 0.1 mm, preferably greater than 0.15 mm;
- the sintered bead exhibits a sphericity of greater than 0.7, preferably greater than 0.8, preferably greater than 0.85, indeed even greater than 0.9;
- the density of the sintered bead is greater than 4.6 $g/cm^3$, preferably greater than 4.7 $g/cm^3$, indeed even greater than 4.8 g/cm³, and/or less than 5.5 g/cm³, preferably less than 5.3 g/cm³, preferably less than 5.2 g/cm³.

In a first embodiment, a sintered bead according to the invention exhibits:
- a zircon content, as percentage by weight based on the total amount of crystalline phases, of greater than or equal to 10%, preferably greater than 15%, and less than 25%, preferably less than 20%, and
- a stabilized zirconia content, as percentage by weight based on the total amount of crystalline phases, of greater than 50% and less than 80%, preferably less than 70%, the cubic zirconia level being greater than 50%, preferably greater than 55%, preferably greater than 60%, preferably greater than 65%, preferably greater than 70%, preferably greater than 75%, preferably greater than 80%, indeed even greater than 85%, indeed even greater than 90%, indeed even greater than 95%, and
- a monoclinic zirconia content, as percentage by weight based on the total amount of crystalline phases, of less than 5%, preferably substantially zero, and
- a corundum content, as percentage by weight based on the total amount of crystalline phases, of greater than 10%, preferably greater than 15%, and less than 35%, preferably less than 30%, preferably less than 28%, preferably less than 26%, preferably less than 25%, and
- a total content of crystalline phases other than zircon, stabilized zirconia, monoclinic zirconia and corundum, as percentage by weight based on the total amount of crystalline phases, of less than 6%, indeed even less than 5%, indeed even less than 4%, and
- preferably, an amount by weight of amorphous phase, as percentage by weight with respect to the weight of the bead, of less than 10%, preferably less than 8%, and
- a content of $ZrO_2$+$HfO_2$ of greater than 43.5%, preferably greater than 46.0%, preferably greater than 50.0%, preferably greater than 53.0%, preferably greater than 56.0%, preferably greater than 57.0%, and less than 80.2%, preferably less than 75.0%, preferably less than 72.0%, as percentages by weight based on the oxides, and
- an $HfO_2$ content of less than 4.0%, preferably less than 3.0%, preferably less than 2.0%, as percentages by weight based on the oxides, and
- an $SiO_2$ content of greater than 4.5%, preferably greater than 6.0%, preferably greater than 7.5%, and less than 13.6%, preferably less than 12.0%, preferably less than 11.0%, as percentages by weight based on the oxides, and
- an $Al_2O_3$ content of greater than 10.5%, preferably greater than 12.0%, and less than 34.9%, preferably less than 32.0%, preferably less than 30.0%, preferably less than 27.0%, preferably less than 25.0%, preferably less than 23.0%, preferably less than 20.0%, as percentages by weight based on the oxides, and
- a $Y_2O_3$ content of greater than 2.8%, preferably greater than 3.0%, preferably greater than 3.6%, preferably greater than 4.0%, preferably greater than 4.5%, and less than 19.2%, preferably less than 18.0%, preferably less than 16.0%, preferably less than 15.0%, preferably less than 14.0%, preferably less than 13.0%, as percentages by weight based on the oxides, and
- an MgO content of greater than 0.1%, preferably greater than 0.15%, indeed even greater than 0.2%, indeed even greater than 0.3%, and less than 4.0%, preferably less than 3.0%, preferably less than 2.0%, preferably less than 1.5%, preferably less than 1.0%, as percentages by weight based on the oxides, and
- a CaO content of greater than 0.1%, preferably greater than 0.2%, preferably greater than 0.3%, and less than 1.5%, preferably less than 1.0%, as percentages by weight based on the oxides, and
- a content of oxides other than $ZrO_2$, $HfO_2$, $SiO_2$, $Al_2O_3$, $Y_2O_3$, CaO and MgO of less than 4.0%, preferably less than 3.0%, preferably less than 2.0%, indeed even less than 1.5%, indeed even less than 1.0%, as percentages by weight based on the oxides (preferably, the $Na_2O$ content is less than 0.8%, preferably less than 0.5%, preferably less than 0.3%, preferably less than 0.2%, and/or the $K_2O$ content is less than 0.8%, preferably less than 0.5%, preferably less than 0.3%, preferably less than 0.2%), and
- any oxide other than $ZrO_2$, $HfO_2$, $SiO_2$, $Al_2O_3$, $Y_2O_3$, CaO and MgO being preferably present in an amount of less than 2.0%, preferably less than 1.5%, preferably less than 1.0%, indeed even less than 0.8%, indeed even less than 0.5%, indeed even less than 0.3%, and oxides other than $ZrO_2$, $HfO_2$, $SiO_2$, $Al_2O_3$, $Y_2O_3$, CaO and MgO being preferably impurities, and
- the content of oxides being preferably greater than 99%, preferably greater than 99.5%, preferably greater than 99.9% and more preferably substantially equal to 100% of the total weight of said bead.

In a second embodiment, a sintered bead according to the invention exhibits:
- a corundum content, as percentage by weight based on the total amount of crystalline phases, of greater than 10%, preferably greater than 15%, and less than 35%, preferably less than 30%, preferably less than 28%, preferably less than 26%, preferably less than 25%, and
- a stabilized zirconia content, as percentage by weight based on the total amount of crystalline phases, of greater than 50%, preferably greater than 60%, and less than 90%, preferably less than 85%, the cubic zirconia level being greater than 50%, preferably greater than 55%, preferably greater than 60%, preferably greater than 65%, preferably greater than 70%, preferably greater than 75%, preferably greater than 80%, indeed even greater than 85%, indeed even greater than 90%, indeed even greater than 95%, and
- a monoclinic zirconia content, as percentage by weight based on the total amount of crystalline phases, of less than 5%, preferably substantially zero, and
- a zircon content, as percentage by weight based on the total amount of crystalline phases, of less than 4%, preferably substantially zero, and
- a content of crystalline phases other than zircon, stabilized zirconia, monoclinic zirconia and corundum, as percentage by weight based on the total amount of crystalline phases, of less than 6%, indeed even less than 5%, indeed even less than 4%, and
- preferably, an amount by weight of amorphous phase, as percentage by weight with respect to the weight of the bead, of less than 10%, preferably less than 8%, and
- a $ZrO_2$+$HfO_2$ content of greater than 44.6%, preferably greater than 46.0%, preferably greater than 50.0%, preferably greater than 53.0%, preferably greater than 56.0%, preferably greater than 57.0%, and less than 82.9%, preferably less than 80.2%, preferably less than 75.0%, preferably less than 72.0%, preferably less than 70.0%, as percentages by weight based on the oxides, and an HfO$_2$ content of less than 4.0%, preferably less than 3.0%, preferably less than 2.0%, as percentages by weight based on the oxides, and an SiO$_2$ content of greater than 1.0%, preferably greater than 1.3%, preferably greater than 2.0%, preferably greater than 2.5%, and less than 6.1%, preferably less than 5.5%, preferably less than 5.0%, as percentages by weight based on the oxides, and an Al$_2$O$_3$ content of greater than 10.5%, preferably greater than 12.0%, preferably greater than 15.0%, preferably greater than 18.0%, preferably greater than 20.0%, and less than 34.9%, preferably less than 32.0%, preferably less than 30.0%, preferably less than 28.0%, preferably less than 26.0%, preferably less than 25.0%, as percentages by weight based on the oxides, and a Y$_2$O$_3$ content of greater than 3.6%, preferably greater than 4.0%, preferably greater than 4.5%, preferably greater than 5.0%, preferably greater than 5.5%, and less than 21.6%, preferably less than 20.0%, preferably less than 19.2%, preferably less than 18.0%, preferably less than 16.0%, preferably less than 15.0%, preferably less than 14.0%, as percentages by weight based on the oxides, and an MgO content of greater than 0.1%, preferably greater than 0.15%, indeed even greater than 0.2%, indeed even greater than 0.3%, and less than 4.0%, preferably less than 3.0%, preferably less than 2.0%, preferably less than 1.5%, preferably less than 1.0%, as percentages by weight based on the oxides, and a CaO content of greater than 0.1%, preferably greater than 0.2%, preferably greater than 0.3%, and less than 1.5%, preferably less than 1.0%, as percentages by weight based on the oxides, and a total content of oxides other than ZrO$_2$, HfO$_2$, SiO$_2$, Al$_2$O$_3$, Y$_2$O$_3$, CaO and MgO of less than 4.0%, preferably less than 3.0%, preferably less than 2.0%, indeed even less than 1.5%, indeed even less than 1.0%, as percentages by weight based on the oxides (preferably, the Na$_2$O content is less than 0.8%, preferably less than 0.5%, preferably less than 0.3%, preferably less than 0.2%, and/or the K$_2$O content is less than 0.8%, preferably less than 0.5%, preferably less than 0.3%, preferably less than 0.2%), and any oxide other than ZrO$_2$, HfO$_2$, SiO$_2$, Al$_2$O$_3$, Y$_2$O$_3$, CaO and MgO being preferably present in an amount of less than 2.0%, preferably less than 1.5%, preferably less than 1.0%, indeed even less than 0.8%, indeed even less than 0.5%, indeed even less than 0.3%, and oxides other than ZrO$_2$, HfO$_2$, SiO$_2$, Al$_2$O$_3$, Y$_2$O$_3$, CaO and MgO being preferably impurities, and the content of oxides being preferably greater than 99%, preferably greater than 99.5%, preferably greater than 99.9% and more preferably substantially equal to 100% of the total weight of said bead.

Process for the Manufacture of the Sintered Beads

In order to manufacture the sintered beads according to the invention, it is possible to proceed according to stages a) to g) described above and presented in detail below.

In stage a), a particulate mixture exhibiting a median size of less than 0.6 µm is prepared. The composition of the particulate mixture is also suitable, in a way known per se, for the sintered beads to have a composition in accordance with the invention.

The powders are intimately mixed.

The powders of starting materials can be ground individually or, preferably, co-ground in order for the particulate mixture obtained to exhibit a median size of less than 0.6 µm, preferably less than 0.5 µm, preferably less than 0.4 µm, preferably less than 0.3 µm. This grinding can be a wet grinding.

A grinding or a co-grinding can also be used to obtain an intimate mixture.

The particulate mixture can comprise a zircon powder which preferably exhibits a specific area, calculated by the BET method, of greater than 5 m$^2$/g, preferably greater than 8 m$^2$/g, preferably greater than 10 m$^2$/g, and/or less than 30 m$^2$/g.

The content of stabilized zirconia in the particulate mixture is greater than 45% and less than 88%, preferably less than 83%, by weight based on the weight of the particulate mixture.

Preferably, the particulate mixture comprises a stabilized zirconia powder which preferably exhibits a specific area, calculated by the BET method, of greater than 0.5 m$^2$/g, preferably greater than 1 m$^2$/g, preferably greater than 1.5 m$^2$/g, and/or less than 20 m$^2$/g, preferably less than 18 m$^2$/g, preferably less than 15 m$^2$/g. Advantageously, the optional grinding, generally in suspension, is thereby facilitated. Moreover, the sintering temperature in stage f) can be reduced.

More than 50% by weight of the stabilized zirconia in the particulate mixture is in the cubic form. Preferably, more than 55%, preferably more than 60%, preferably more than 65%, preferably more than 70%, preferably more than 75%, preferably more than 80%, indeed even more than 85%, indeed even more than 90%, indeed even more than 95%, by weight, of the stabilized zirconia is in the cubic form. In one embodiment, the stabilized zirconia is present substantially only in the cubic form.

Preferably, the particulate mixture comprises a cubic zirconia powder. Preferably, the molar content of Y$_2$O$_3$ of the cubic zirconia powder is between 7.5 mol % and 11 mol %, based on the total content of ZrO$_2$, Y$_2$O$_3$ and HfO$_2$.

The particulate mixture can also comprise a tetragonal zirconia powder and/or a monoclinic zirconia powder in an amount of less than or equal to (10%–0.2 times the content by weight of tetragonal zirconia powder in the particulate mixture). Preferably, the particulate mixture does not contain monoclinic zirconia powder.

According to the invention, it is essential for the stabilized zirconia to be at least partly, preferably completely, stabilized by means of Y$_2$O$_3$. Preferably, substantially all the cubic zirconia, preferably all the stabilized zirconia, is stabilized with Y$_2$O$_3$.

The particulate mixture preferably comprises a corundum powder which preferably exhibits a median size of less than 7 µm, preferably less than 6 µm, indeed even less than 3 µm, indeed even less than 2 µm, indeed even less than 1.5 µm.

The particulate mixture preferably contains a corundum powder in an amount of greater than 4.5%, preferably greater than 7.3%, preferably greater than 9.1%, preferably greater than 13.6%, and less than 44%, preferably less than 39.2%, preferably less than 34.3%, preferably less than 29.4%, by weight based on the weight of the particulate mixture. Preferably, the corundum powder is a reactive alumina powder and/or a calcined alumina powder. Preferably, the corundum powder is a reactive alumina powder.

In a first embodiment, the particulate mixture comprises a powder of a compound providing SiO$_2$ chosen from a powder of particles made of a glass containing SiO$_2$, a powder of silica particles, a powder of particles made of a glass-ceramic containing SiO$_2$, and their mixtures, preferably in an amount of preferably greater than 0.5%, preferably greater than 1%, and/or less than 6%, preferably less than 5%, preferably less than 4%, preferably less than 3%, preferably less than 2%, as percentage by weight based on the weight of the particulate mixture. Preferably, said powder of a compound providing $SiO_2$ contains more than 40%, preferably more than 50%, indeed even more than 60%, indeed even more than 70%, indeed even more than 80%, by weight of $SiO_2$. Preferably, the powder of a compound providing $SiO_2$ is chosen from a powder of particles made of a glass containing $SiO_2$, a powder of silica particles and their mixtures. Preferably again, the glass-ceramic powder also comprises MgO.

The compound comprising MgO and $SiO_2$ also comprises, preferably, $Al_2O_3$. Preferably, said compound is chosen from a talc, cordierite and their mixtures. Preferably, said compound is cordierite.

In a second embodiment, the particulate mixture contains cordierite, preferably in an amount of preferably greater than 0.5%, preferably greater than 1%, preferably greater than 1.5%, and/or less than 10%, preferably less than 8%, preferably less than 6%, preferably less than 5%, preferably less than 4%, preferably less than 3%, as percentage by weight based on the weight of the particulate mixture.

In a third embodiment, the particulate mixture contains a clay, preferably in an amount of greater than 0.5%, preferably greater than 1%, preferably greater than 1.5%, and/or less than 5%, preferably less than 4%, preferably less than 3%, as percentage by weight based on the weight of the particulate mixture.

In one embodiment, the first to third embodiments described immediately above are combined.

In a process according to the invention, the particulate mixture comprises powders
    of cubic zirconia,
    of corundum,
    of glass containing $SiO_2$ and/or of silica and/or of glass-ceramic containing $SiO_2$ and/or of a compound comprising MgO and $SiO_2$, and
    optionally, of zircon $ZrSiO_4$ and/or of monoclinic zirconia and/or of tetragonal zirconia.

In a first main embodiment, the particulate mixture contains:
    a zircon powder, in an amount of greater than 9.1%, preferably greater than 13.6%, and less than 24.5%, preferably less than 19.6%, by weight based on the weight of the particulate mixture, and
    a powder of particles of zirconia stabilized with $Y_2O_3$ in an amount of greater than 45% and less than 78.4%, preferably less than 68.6%, by weight based on the weight of the particulate mixture, more than 50%, preferably more than 55%, preferably more than 60%, preferably more than 65%, preferably more than 70%, preferably more than 75%, preferably more than 80%, indeed even more than 85%, indeed even more than 90%, indeed even more than 95%, by weight of the stabilized zirconia particles being in the cubic form, the molar content of $Y_2O_3$ of the cubic zirconia powder preferably being between 7.5 mol % and 11 mol %, based on the total content of $ZrO_2$, $Y_2O_3$ and $HfO_2$, and
    a corundum powder, in an amount of greater than 9.1%, preferably greater than 13.6%, and less than 34.3%, preferably less than 29.4%, by weight based on the weight of the particulate mixture, preferably, the corundum powder being a reactive alumina powder and/or a calcined alumina powder, preferably the corundum powder being a reactive alumina powder, and
    a silica powder, in an amount of preferably greater than 0.5%, preferably greater than 1%, and/or less than 6%, preferably less than 5%, preferably less than 4%, preferably less than 3%, preferably less than 2%, as percentage by weight based on the weight of the particulate mixture, and
    a cordierite powder, in an amount of preferably greater than 0.5%, preferably greater than 1%, preferably greater than 1.5%, and/or less than 10%, preferably less than 8%, preferably less than 6%, preferably less than 5%, preferably less than 4%, preferably less than 3%, as percentage by weight based on the weight of the particulate mixture, and
    a clay powder, preferably in an amount of greater than 0.5%, preferably greater than 1%, preferably greater than 1.5%, and/or less than 5%, preferably less than 4%, preferably less than 3%, as percentage by weight based on the weight of the particulate mixture.

In a second main embodiment, the particulate mixture contains:
    a corundum powder, in an amount of greater than 9.1%, preferably greater than 13.6%, and less than 34.3%, preferably less than 29.4%, by weight based on the weight of the particulate mixture, preferably, the corundum powder being a reactive alumina powder and/or a calcined alumina powder, preferably the corundum powder being a reactive alumina powder, and
    a powder of particles of zirconia stabilized with $Y_2O_3$ in an amount of greater than 45%, preferably greater than 54.5%, and less than 88%, preferably less than 83.3%, by weight based on the weight of the particulate mixture, more than 50%, preferably more than 55%, preferably more than 60%, preferably more than 65%, preferably more than 70%, preferably more than 75%, preferably more than 80%, indeed even more than 85%, indeed even more than 90%, indeed even more than 95%, by weight of the stabilized zirconia particles being in the cubic form, the molar content of $Y_2O_3$ of the cubic zirconia powder preferably being between 7.5 mol % and 11 mol %, based on the total content of $ZrO_2$, $Y_2O_3$ and $HfO_2$, and
    a silica powder, in an amount of preferably greater than 0.5%, preferably greater than 1%, and/or less than 6%, preferably less than 5%, preferably less than 4%, preferably less than 3%, preferably less than 2%, as percentage by weight based on the weight of the particulate mixture, and
    a cordierite powder, in an amount of preferably greater than 0.5%, preferably greater than 1%, preferably greater than 1.5%, and/or less than 10%, preferably less than 8%, preferably less than 6%, preferably less than 5%, preferably less than 4%, preferably less than 3%, as percentage by weight based on the weight of the particulate mixture, and
    a clay powder, preferably in an amount of greater than 0.5%, preferably greater than 1%, preferably greater than 1.5%, and/or less than 5%, preferably less than 4%, preferably less than 3%, as percentage by weight based on the weight of the particulate mixture.

The powders providing the oxides are preferably chosen so that the total content of oxides other than $ZrO_2$, $HfO_2$, $SiO_2$, $Al_2O_3$, MgO, CaO and $Y_2O_3$ is less than 5%, as percentage by weight based on the oxides.

Preferably, no starting material other than the powders of cubic zirconia, optionally of tetragonal zirconia, optionally of monoclinic zirconia, optionally of zircon, of corundum, of glass containing $SiO_2$, and/or of silica, and/or of glass-ceramic containing $SiO_2$, and/or of compound comprising MgO and $SiO_2$ is intentionally introduced into the particulate mixture, the other oxides present being impurities.

Preferably, the powders used, in particular the powders of cubic zirconia, of corundum, of glass containing $SiO_2$, and/or of silica, and/or of glass-ceramic containing $SiO_2$, and/or of compound comprising MgO and $SiO_2$, the optional powders of zircon, of monoclinic zirconia and of tetragonal zirconia, each exhibit a median size of less than 5 μm, indeed even less than 3 μm, less than 1 μm, less than 0.7 μm, preferably less than 0.6 μm, preferably less than 0.5 μm, preferably less than 0.4 μm, indeed even less than 0.3 μm. Advantageously, when each of these powders exhibits a median size of less than 0.6 μm, preferably less than 0.5 μm, preferably less than 0.4 μm, indeed even less than 0.3 μm, grinding is optional.

Whatever the embodiment, one or more of the powders of the particulate mixture which are described above can be replaced, at least partially, by equivalent powders, that is to say by powders which, during the manufacture of a bead according to the invention, result, in said bead, in the same constituents (same composition, same crystallographic phase), in the same amounts.

In particular, the powders of cubic zirconia and of tetragonal zirconia can be replaced, partially or completely, by powders comprising particles containing $ZrO_2+HfO_2$, and $Y_2O_3$, preferably intimately mixed, the amount of $Y_2O_3$ being suitable for obtaining, on conclusion of stage g), cubic and tetragonal zirconia, respectively.

A powder equivalent to a corundum powder is, for example, a transition alumina powder.

In stage b), which is optional, the powders of ground starting materials are dried, for example in an oven or by spray drying, in particular if they were obtained by wet grinding. Preferably, the temperature and/or the duration of the drying stage are adjusted so that the residual moisture content of the powders of starting materials is less than 2%, indeed even less than 1.5%.

In stage c), a starting charge is prepared, preferably at ambient temperature, which charge comprises the particulate mixture obtained at the end of stage a) or at the end of stage b) and, optionally, a solvent, preferably water, the amount of which is suitable for the shaping method of stage d).

As is well known by a person skilled in the art, the starting charge is suitable for the shaping process of stage d).

The shaping can in particular result from a gelling process. For this purpose, a solvent, preferably water, is preferably added to the starting charge so as to produce a suspension.

The suspension preferably exhibits a solids content by weight of between 50% and 70%.

The suspension can also comprise one or more of the following constituents:
- a dispersant, in a proportion of 0% to 10%, as percentage by weight based on the solids content;
- a surface tension modifier, in a proportion of 0% to 3%, as percentage by weight based on the solids content;
- a gelling agent, or "gelation agent", in a proportion of 0% to 2%, as percentage by weight based on the solids content.

The dispersants, surface tension modifiers and gelling agents are well known to a person skilled in the art.

Mention may be made, as examples, of,
- as dispersants, the family of sodium or ammonium polymethacrylates, the family of sodium or ammonium polyacrylates, the family of citrates, for example of ammonium citrate, the family of sodium phosphates, and the family of carbonic acid esters;
- as surface tension modifiers, organic solvents such as aliphatic alcohols;
- as gelling agents, natural polysaccharides.

The particulate mixture is preferably added to a mixture of water and of dispersants/deflocculants in a ball mill. After stirring, water, in which a gelling agent has been dissolved beforehand, is added, so as to obtain a suspension.

If the shaping results from an extrusion, thermoplastic polymers or thermosetting polymers can be added to the starting charge, said starting charge preferably not containing a solvent.

In stage d), any conventional shaping process known for the manufacture of sintered beads can be employed.

Mention may be made, among these methods, of:
- granulation processes, for example employing granulators, fluidized bed granulators, or granulating disks,
- gelation processes,
- injection molding or extrusion processes, and
- pressing processes.

In a gelation process, drops of the suspension described above are obtained by flow of the suspension through a calibrated orifice. The drops exiting from the orifice fall into a bath of a gelling solution (electrolyte suitable for reacting with the gelling agent) where they harden after regaining a substantially spherical shape.

In stage e), which is optional, the crude beads obtained during the previous stage are washed, for example with water.

In stage f), which is optional, the crude beads, which are optionally washed, are dried, for example in an oven.

In stage g), the crude beads, which are optionally washed and/or dried, are sintered. Preferably, the sintering is carried out under air, preferably in an electric furnace, preferably at atmospheric pressure.

The sintering in stage g) is carried out at a temperature of greater than 1330° C., preferably greater than 1340° C., preferably greater than 1350° C., preferably greater than 1360° C., preferably greater than 1370° C., and less than 1450° C., preferably less than 1430° C., preferably less than 1410° C., preferably less than 1400° C., preferably less than 1390° C. A sintering temperature equal to 1375° C. is well suited.

Preferably, the sintering time is between 2 and 5 hours. A sintering time equal to 4 hours is very suitable.

The sintered beads obtained preferably exhibit a smaller diameter of greater than 0.005 mm, preferably greater than 0.1 mm, preferably greater than 0.15 mm, and less than 10 mm, preferably less than 2.5 mm.

The sintered beads according to the invention are particularly well suited as grinding agents or as dispersing agents in wet media, and also for surface treatment. The invention thus also relates to the use of a powder of beads according to the invention, or of beads manufactured according to a process according to the invention, as grinding agents, or dispersing agents in wet media.

The properties of the beads according to the invention, in particular their mechanical resistance, their density, as well as the ease with which they are obtained, make them suitable for other applications, in particular as propping agents or heat-exchange agents, or also for surface treatment (by projection of the beads according to the invention, especially).

The invention thus also relates to a device chosen from a suspension, a grinding mill, an apparatus for surface treatment and a heat exchanger, said device comprising a powder of beads according to the invention.

EXAMPLES

The following nonlimiting examples are given for the purpose of illustrating the invention.
Measurement Protocols The following methods were used for determining certain properties of various mixtures of sintered beads. They make possible excellent simulation of the actual behavior, in operation, in the microgrinding application.

In order to determine the sphericity of a bead, the smallest and largest Ferret diameters are measured on a Camsizer XT sold by Horiba.

In order to determine the "planetary" wear, 20 ml (volume measured using a graduated measuring cylinder) of beads to be tested with a size of between 1.8 and 2.0 mm are weighed (weight w0) and introduced into one of 4 jars coated with dense sintered alumina, with a capacity of 125 ml, of a high-speed planetary mill of the PM400 type of the Retsch brand. 2.2 g of silicon carbide of the Presi brand (exhibiting a median size D50 of 23 μm) and 40 ml of water are added to the same jar already containing the beads. The jar is closed and set rotating (planetary motion) at 400 rpm with reversal of the direction of rotation at one minute intervals for 1 h 30 min. The contents of the jar are subsequently washed over a 100 μm sieve so as to remove the residual silicon carbide and also the material stripped due to wear during the grinding operation. After sieving over a 100 μm sieve, the beads are dried in an oven at 100° C. for 3 h and then weighed (weight w1). Said beads (weight w1) are again introduced into one of the jars with a SiC suspension (same concentration and amount as above) and subjected to a new grinding cycle, identical to the preceding cycle. The contents of the jar are subsequently washed over a 100 μm sieve so as to remove the residual silicon carbide and also the material stripped due to wear during the grinding operation. After sieving over a 100 μm sieve, the beads are dried in an oven at 100° C. for 3 h and then weighed (weight w2). Said beads (weight w2) are again introduced into one of the jars with a SiC suspension (same concentration and amount as above) and subjected to a new grinding cycle, identical to the preceding cycle. The contents of the jar are subsequently washed over a 100 μm sieve so as to remove the residual silicon carbide and also the material stripped due to wear during the grinding operation. After sieving over a 100 μm sieve, the beads are dried in an oven at 100° C. for 3 h and then weighed (weight w3).

The planetary wear (PW) is expressed as percentage (%) and is equal to the loss of weight of the beads relative to the initial weight of the beads, i.e.: $100(w2-w3)/(w2)$; the PW result is given in table 2.

The hydrothermal attack on the beads of the examples is carried out according to the following protocol: for each of the examples, 30 ml of beads (volume measured using a graduated measuring cylinder) are introduced into an autoclave comprising a Teflon chamber with a total capacity equal to 45 ml and containing 20 ml of an aqueous calcium carbonate $CaCO_3$ suspension exhibiting a stable pH equal to 9.3 and having a solids content of 70%, 40% of the $CaCO_3$ grains by volume of which are less than 1 μm. After closing the autoclave, everything is brought in an oven to a temperature equal to 140° C. and maintained at this temperature for 24 hours. The autoclave is subsequently taken out of the oven and then naturally cooled down to ambient temperature. The hydrothermal attack makes it possible to demonstrate the behavior of the beads under hydrothermal conditions.

The quantification of the crystalline phases present in the sintered beads before and after hydrothermal attack is carried out directly on the beads, said beads being adhesively bonded to a self-adhesive carbon pellet, so that the surface of said pellet is covered as much as possible with beads.

The crystalline phases present in the sintered beads according to the invention are measured by X-ray diffraction, for example by means of an appliance of the X'Pert PRO diffractometer type from Panalytical provided with a copper XRD tube. The diffraction pattern is acquired using this item of equipment, over a 2θ angular range of between 5° and 100°, with a step of 0.017°, and a counting time of 150 s/step. The front optics comprise a programmable divergence slit, used fixed, of ¼°, Soller slits of 0.04 rad, a mask equal to 10 mm and a fixed anti-scattering slit of ½°. The sample is in rotation about itself in order to limit the preferred orientations. The rear optics comprise a programmable anti-scattering slit, used fixed, of ¼°, a Soller slit of 0.04 rad and a Ni filter.

The diffraction patterns were subsequently analyzed qualitatively using the EVA software and the ICDD2016 database.

Once the present phases were highlighted, the diffraction patterns were analyzed quantitatively with the High Score Plus software by Rietveld refinement according to the following strategy:

A refinement of the background signal is carried out using the "treatment" function, "determine background", with the following choices: "bending factor" equal to 0 and "granularity" equal to 40;

Conventionally, the ICDD files of the highlighted and quantifiable phases present are selected, and thus taken into account in the refinement;

An automatic refinement is subsequently carried out by selecting the background signal determined above, "use available background", and by selecting the mode, "automatic: option phase fit-default Rietveld";

A manual refinement of the "B overall" parameter of all the selected phases is subsequently carried out simultaneously;

Finally, a simultaneous manual refinement of the Caglioti parameter W of the tetragonal zirconia and cubic zirconia phases is carried out if the automatic function has not done so. In this case, "W" is selected for said zirconia phases and the refinement is carried out again. The results are only kept if the "Goodness of fit" parameter of the second refinement is lower than that of the first refinement.

The amount of amorphous phase present in the sintered beads according to the invention is measured by X-ray diffraction, for example by means of an appliance of the X'Pert PRO diffractometer type from Panalytical provided with a copper XRD tube. The diffraction pattern is acquired using this item of equipment, in the same way as for the determination of the crystalline phases present in the beads, the sample analyzed being provided in the form of a powder. The method applied consists of the addition of a known amount of a completely crystalline standard, in the present case a zinc oxide ZnO powder, in an amount equal to 20%, based on the weight of zinc oxide and of sample of ground sintered beads according to the invention. The maximum size of the zinc oxide powder is equal to 1 μm and the beads according to the invention are ground so as to obtain a powder exhibiting a maximum size of less than 40 μm.

The maximum size of the ZnO particles is entered in the High Score Plus software so as to limit the effects of microabsorption.

The content of amorphous phase, as percentage, is calculated using the following formula, $Q_{ZnO}$ being the amount of ZnO determined from the diffraction pattern:

Content of amorphous phase=$100*(100/(100-20))*(1-(20/Q_{ZnO}))$.

For example, if $Q_{ZnO}$ is equal to 22%, then the content of amorphous phase is equal to $100*(100/(100-20))*(1-(20/22))=11.4\%$.

The density of the beads, in g/cm$^3$, is measured using a helium pycnometer (AccuPyc 1330 from Micromeritics®), according to a method based on the measurement of the volume of gas displaced (in the present case helium).

Manufacturing Protocol

Sintered beads were prepared from:
- a zircon powder, exhibiting a specific area of the order of 8 m$^2$/g, a median size equal to 1.5 µm and a total content of oxides other than $ZrO_2$ and $SiO_2$ equal to 1.1%,
- a cordierite powder with a purity of greater than 95% and a median size of less than 63 µm,
- a clay powder with a median size of less than 53 µm, exhibiting a loss on ignition carried out at 1000° C. of between 10% and 15% and exhibiting a total $SiO_2$+$Al_2O_3$ content of greater than 82%,
- a silica powder with a purity of greater than 98.5% and exhibiting a median size equal to 1.5 µm, and, depending on the examples produced,
- an $Al_2O_3$ powder with a purity equal to 99.5% and with a median size of less than 5 µm,
- a stabilized zirconia powder CY3Z sold by Saint-Gobain ZirPro, exhibiting a molar content of $Y_2O_3$ equal to 3% and being provided predominantly in a tetragonal crystallographic form,
- and a stabilized zirconia powder TZ-10Y, sold by Tosoh, exhibiting a molar content of $Y_2O_3$ equal to 10% and being provided in a substantially completely cubic crystallographic form.

The particulate mixtures of the examples are summarized in the following table 1.

TABLE 1

| Examples | 1 (*) | 2 | 3 |
|---|---|---|---|
| Composition of the particulate mixture | | | |
| Zircon powder | — | — | 19.2 |
| Stabilized zirconia powder CY3Z | 71.2 | — | — |
| Stabilized zirconia powder TZ-10Y | — | 79.2 | 60 |
| $Al_2O_3$ powder | 23 | 15 | 15 |
| Silica powder | 1.4 | 1.4 | 1.4 |
| Cordierite powder | 1.9 | 1.9 | 1.9 |
| Clay powder | 2.5 | 2.5 | 2.5 |

(*): outside the invention

The various powders were mixed and then co-ground in a wet medium until a particulate mixture was obtained exhibiting a median size of less than 0.3 µm. The particulate mixture was subsequently dried.

For examples 1 and 2, a starting charge consisting of an aqueous suspension comprising, as percentages as percentage by weight based on the solids content, 1% of a dispersant of carboxylic acid ester type, 3% of a dispersant of carboxylic acid type and 0.4% of a gelling agent, namely a polysaccharide of the alginate family, was subsequently prepared from the particulate mixture of example 1 and 2, respectively.

For example 3, a starting charge consisting of an aqueous suspension comprising, as percentages as percentage by weight based on the solids content, 1% of a dispersant of carboxylic acid ester type, 0.7% of a dispersant of sodium phosphate type, 3% of a dispersant of carboxylic acid type and 0.4% of a gelling agent, namely a polysaccharide of the alginate family, was subsequently prepared from the particulate mixture of example 3.

A ball mill was used for this preparation so as to obtain good homogeneity of the starting charge. A solution containing the gelling agent was first formed. Successively, the particulate mixture and the dispersants were added to water. The solution containing the gelling agent was subsequently added. The mixture thus obtained was stirred for 8 hours. The size of the particles was monitored using a model LA950V2 laser particle size analyzer sold by Horiba (median size<0.3 µm), then water was added in an amount determined in order to obtain an aqueous suspension having a solids content of 68% and a viscosity, measured with a Brookfield viscometer using the LV3 spindle at a speed equal to 20 revolutions/minute, of less than 5000 centipoise. The pH of the suspension was then approximately 9 after an optional adjustment using a strong base.

The suspension was forced through a calibrated orifice and at a flow rate making it possible to obtain, after sintering, beads of approximately 1.8 mm to 2.0 mm in the context of this example. The drops of suspension fell into a gelling bath based on an electrolyte (divalent cation salt), reacting with the gelling agent. The crude beads were collected, washed and then dried at 80° C. in order to remove the moisture. The beads were subsequently transferred to a sintering furnace where they were brought, at a rate of 100° C./h, to a temperature equal to 1375° C. At the end of a 4 hour stationary phase at this temperature, the temperature was lowered by natural cooling.

Results

The results obtained are summarized in the following table 2.

TABLE 2

| Examples | 1 (*) | 2 | 3 |
|---|---|---|---|
| Chemical analysis, as percentages by weight based on the oxides | | | |
| $ZrO_2$ + $HfO_2$ (%) | 66.9 | 64.7 | 61.5 |
| $SiO_2$ (%) | 3.7 | 3.6 | 10.0 |
| $Al_2O_3$ (%) | 24.4 | 16.5 | 16.2 |
| $Y_2O_3$ (%) | 3.9 | 14.3 | 10.4 |
| CaO (%) | 0.6 | 0.4 | 0.8 |
| MgO (%) | 0.3 | 0.2 | 0.3 |
| Other oxides (%) | 0.2 | 0.3 | 0.8 |
| including $P_2O_5$ (%) | — | — | 0.5 |
| Crystalline phases, as % by weight based on the weight of the crystalline phases, before hydrothermal attack | | | |
| Zircon (%) | — | — | 19 |
| Monoclinic zirconia (%) | — | — | — |
| Tetragonal zirconia (%) | 62 | — | — |
| Cubic zirconia (%) | 8 | 76 | 58 |
| Corundum (%) | 30 | 24 | 23 |
| Other crystalline phases (%) | — | — | — |
| Characteristics | | | |
| Density beads g/cm$^3$ | 5.0 | 5.1 | 4.8 |
| Planetary wear PW (as %) | 1.4 | 1.4 | 1.5 |

TABLE 2-continued

| Examples | 1 (*) | 2 | 3 |
|---|---|---|---|
| % of tetragonal and cubic zirconia transformed into monoclinic zirconia after hydrothermal attack | 12.8% | 0% | 0% |

(*): outside the invention

The powders of beads of the examples exhibit a mean sphericity of greater than 0.9.

The beads of examples 1 to 3 exhibit an amount of amorphous phase of less than 10% by weight.

The reference beads of example 1, outside the invention, are sintered beads of alumina-zirconia type.

The inventors consider that the planetary wear of an example is not significantly different from that of the comparative example when the difference between these two planetary wear results is less than 10%.

The inventors also consider that a transformation into monoclinic zirconia of more than 10% by weight of zirconia stabilized in the tetragonal and cubic form, after hydrothermal attack, is detrimental to the grinding performance of the sintered beads.

A comparison of example 1 outside the invention, and of example 2 according to the invention comprising 79.2% of a cubic zirconia powder in the particulate mixture, shows that example 2 exhibits a planetary wear substantially identical to that of reference example 1, but that the stabilized zirconia of example 2 is not substantially transformed into monoclinic zirconia during the hydrothermal attack, unlike example 1 outside the invention, 12.8% of the zirconia stabilized in the tetragonal form of which was transformed into monoclinic zirconia during the hydrothermal attack.

A comparison of example 1 outside the invention, and of example 3 according to the invention comprising 60% of a cubic zirconia powder in the particulate mixture, shows that example 3 exhibits a planetary wear substantially identical to that of reference example 1, but that the stabilized zirconia of example 3 is not substantially transformed into monoclinic zirconia during the hydrothermal attack, unlike example 1 outside the invention, 12.8% of the zirconia stabilized in the tetragonal form of which was transformed into monoclinic zirconia during the hydrothermal attack.

The examples show that, surprisingly, and contrary to the general knowledge of a person skilled in the art, the beads according to the invention tested, manufactured from a particulate mixture comprising cubic zirconia, exhibit, compared with the reference beads, an improvement in the resistance under hydrothermal conditions without a significant increase in the planetary wear.

The invention claimed is:

1. A sintered bead exhibiting:
the following crystalline composition, as percentages by weight based on the total weight of the crystalline phases and for a total of 100%:
zircon<25%;
50%≤cubic zirconia+tetragonal zirconia≤95%, the cubic zirconia content being greater than 50%, the cubic zirconia content being the (cubic zirconia/(cubic zirconia+tetragonal zirconia) ratio by weight);
0≤monoclinic zirconia≤(10−0.2*tetragonal zirconia) %;
5%≤corundum≤50%;
crystalline phases other than zircon, cubic zirconia, tetragonal zirconia, monoclinic zirconia and corundum<10%;
the following chemical composition, as percentages by weight based on the oxides:
34%≤$ZrO_2$+$HfO_2$, $ZrO_2$+$HfO_2$ being the remainder to 100%;
$HfO_2$≤4.0%;
0.5%≤$SiO_2$≤14.1%;
4.5%≤$Al_2O_3$≤49.6%;
2.75%≤$Y_2O_3$≤22.8%;
MgO≤5%;
CaO≤2%;
oxides other than $ZrO_2$, $HfO_2$, $SiO_2$, $Al_2O_3$, MgO, CaO and $Y_2O_3$<5.0%,
"stabilized zirconia" meaning an assembly consisting of said tetragonal zirconia and said cubic zirconia.

2. The sintered bead as claimed in claim 1, in which, as percentages by weight based on the total weight of the crystalline phases, the zircon content is less than 24% and/or the total content of (cubic zirconia+tetragonal zirconia) is less than 90% and/or the cubic zirconia content is greater than 60% and/or the monoclinic zirconia content is less than 8% and/or the corundum content is greater than 8% and/or the content of crystalline phases other than zircon, cubic zirconia, tetragonal zirconia, monoclinic zirconia and corundum is less than 8%.

3. The sintered bead as claimed in claim 1, in which, as percentage by weight based on the total weight of the crystalline phases, the monoclinic zirconia content is less than 5% and/or the corundum content is less than 45%.

4. The sintered bead as claimed in claim 3, in which, as percentage by weight based on the total weight of the crystalline phases, the corundum content is less than 35%.

5. The sintered bead as claimed in claim 1, in which, as percentages by weight based on the oxides, $ZrO_2$+$HfO_2$>37.0% and/or $SiO_2$>1.0% and/or $Al_2O_3$>7.0% and/or $Y_2O_3$>2.8% and/or MgO>0.1% and/or CaO>0.1%.

6. The sintered bead as claimed in claim 1, in which, as percentages by weight based on the oxides, $ZrO_2$+$HfO_2$>44.6% and/or $SiO_2$>2.0% and/or $Al_2O_3$>10.5% and/or $Y_2O_3$>3.6% and/or MgO>0.15% and/or CaO>0.2%.

7. The sintered bead as claimed in claim 1, in which, as percentages by weight based on the oxides, $ZrO_2$+$HfO_2$<85.0% and/or $HfO_2$<3.0% and/or $SiO_2$<13.6% and/or $Al_2O_3$<45.0% and/or $Y_2O_3$<21.6% and/or MgO<4.0% and/or CaO<1.5% and/or the content of oxides other than $ZrO_2$, $HfO_2$, $SiO_2$, $Al_2O_3$, $Y_2O_3$, CaO and MgO is less than 4.0%.

8. The sintered bead as claimed in claim 7, in which, as percentages by weight based on the oxides, $ZrO_2$+$HfO_2$<75.0% and/or $HfO_2$<2.0% and/or $SiO_2$<12.0% and/or $Al_2O_3$<34.9% and/or $Y_2O_3$<18.0% and/or MgO<2.0% and/or CaO<1.0% and/or the content of oxides other than $ZrO_2$, $HfO_2$, $SiO_2$, $Al_2O_3$, $Y_2O_3$, CaO and MgO is less than 2.0%.

9. The sintered bead as claimed in claim 1, in which, as percentages by weight based on the total weight of the crystalline phases,
the zircon content is greater than or equal to 10% and less than 25%; and
the stabilized zirconia content is greater than 50% and less than 80%, the cubic zirconia content being greater than 50%; and
the monoclinic zirconia content is less than 5%; and
the corundum content is greater than 10% and less than 35%; and
the total content of crystalline phases other than zircon, stabilized zirconia, monoclinic zirconia and corundum is less than 6%; and
as percentages by weight based on the oxides, 80.2%>$ZrO_2$+$HfO_2$>43.5%; and
$HfO_2$<4.0%; and
13.6%>$SiO_2$>4.5%; and
34.9%>$Al_2O_3$>10.5%; and
19.2%>$Y_2O_3$>2.8%; and
4.0%>MgO>0.1%; and
1.5%>CaO>0.1%; and
the content of oxides other than $ZrO_2$, $HfO_2$, $SiO_2$, $Al_2O_3$, $Y_2O_3$, CaO and MgO is less than 4.0%.

10. The sintered bead as claimed in claim 9, in which, as percentages by weight based on the total weight of the crystalline phases,
the zircon content is greater than or equal to 15% and less than 20%; and
the stabilized zirconia content is less than 70%, the cubic zirconia content being greater than 70%; and
the monoclinic zirconia content is zero; and
the corundum content is greater than 15% and less than 30%; and
as percentages by weight based on the oxides,
72.0%>$ZrO_2$+$HfO_2$>57.0%; and
$HfO_2$<3.0%; and
11.0%>$SiO_2$>7.5%; and
20.0%>$Al_2O_3$>12.0%; and
13.0%>$Y_2O_3$>4.5%; and
2.0%>MgO>0.15%; and
1.0%>CaO>0.3%; and
the content of oxides other than $ZrO_2$, $HfO_2$, $SiO_2$, $Al_2O_3$, $Y_2O_3$, CaO and MgO is less than 2.0%.

11. The sintered bead as claimed in claim 1, in which, as percentages by weight based on the total weight of the crystalline phases,
the zircon content is less than 4%; and
the stabilized zirconia content is greater than 50% and less than 90%, the cubic zirconia content being greater than 50%; and
the monoclinic zirconia content is less than 5%; and
the corundum content is greater than 10% and less than 35%; and
the total content of crystalline phases other than zircon, stabilized zirconia, monoclinic zirconia and corundum is less than 6%; and
as percentages by weight based on the oxides,
82.9%>$ZrO_2$+$HfO_2$>44.6%; and
$HfO_2$<4.0%; and
6.1%>$SiO_2$>1.0%; and
34.9%>$Al_2O_3$>10.5%; and
21.6%>$Y_2O_3$>3.6%; and
4.0%>MgO>0.1%; and
1.5%>CaO>0.1%; and
the content of oxides other than $ZrO_2$, $HfO_2$, $SiO_2$, $Al_2O_3$, $Y_2O_3$, CaO and MgO is less than 4.0%.

12. The sintered bead as claimed in claim 11, in which, as percentages by weight based on the total weight of the crystalline phases,
the zircon content is zero; and
the stabilized zirconia content is greater than 60% and less than 85%, the cubic zirconia content being greater than 70%; and
the monoclinic zirconia content is zero; and
the corundum content is greater than 15% and less than 30%; and
as percentages by weight based on the oxides,
70%>$ZrO_2$+$HfO_2$>53.0%; and
$HfO_2$<3.0%; and
5.0%>$SiO_2$>2.5%; and
30.0%>$Al_2O_3$>20.0%; and
14.0%>$Y_2O_3$>5.5%; and
2.0%>MgO>0.15%; and
1.0%>CaO>0.3%; and
the content of oxides other than $ZrO_2$, $HfO_2$, $SiO_2$, $Al_2O_3$, $Y_2O_3$, CaO and MgO is less than 2.0%.

13. A powder comprising more than 90%, as percentages by weight, of beads as claimed in claim 1.

14. A device chosen from a suspension, a grinding mill, an apparatus for surface treatment and a heat exchanger, said device comprising a powder of beads as claimed in claim 13.

15. A process for the manufacture of sintered beads as claimed in claim 1, comprising the following successive stages:
a) preparation of a particulate mixture exhibiting a median size of less than 0.6 μm and a composition suitable for obtaining, on conclusion of stage g), sintered beads as claimed in claim 1, the particulate mixture comprising more than 0.5% by weight of particles made of a glass containing $SiO_2$, and/or of silica particles, and/or of particles made of a glass-ceramic containing $SiO_2$, and/or of particles made of a compound comprising MgO and $SiO_2$, and/or of particles equivalent to these particles,
b) optionally, drying said particulate mixture,
c) preparation of a starting charge from said particulate mixture, which is optionally dried,
d) shaping of the starting charge in the form of crude beads,
e) optionally, washing,
f) optionally, drying,
g) sintering at a sintering temperature of greater than 1330° C. and of less than 1450° C., so as to obtain sintered beads.

16. The manufacturing process as claimed in claim 15, in which, in stage a), one or more powders of starting materials introduced into said particulate mixture are ground.

17. The manufacturing process as claimed in claim 15, in which, in stage a), the particulate mixture comprises a stabilized zirconia powder, in an amount by weight, based on the particulate mixture, of greater than 45% and less than 88%, more than 50% by weight of said stabilized zirconia powder being in the cubic form, said stabilized zirconia being at least in part stabilized by means of $Y_2O_3$.

18. The manufacturing process as claimed in claim 15, in which, in stage a), the particulate mixture comprises, as percentages by weight based on the particulate mixture:
a zircon powder in an amount of greater than 9.1% and less than 24.5%; and
a powder of zirconia stabilized with $Y_2O_3$ in an amount of greater than 45% and less than 78.4%, more than 50% of the stabilized zirconia particles being in the cubic form, as percentage by weight based on the stabilized zirconia particles; and
a corundum powder in an amount of greater than 9.1% and less than 34.3%; and
a silica powder in an amount of greater than 0.5% and less than 6%; and
a cordierite powder in an amount of greater than 0.5% and less than 8%; and
a clay powder in an amount of greater than 0.5% and less than 5%.

19. The manufacturing process as claimed in claim 15, in which, in stage a), the particulate mixture comprises, as percentages by weight based on the particulate mixture:
a powder of zirconia stabilized with $Y_2O_3$ in an amount of greater than 45% and less than 88%, more than 50% of the stabilized zirconia particles being in the cubic form, as percentage by weight based on the stabilized zirconia particles; and a corundum powder in an amount of greater than 9.1% and less than 34.3%; and a silica powder in an amount of greater than 0.5% and less than 6%; and a cordierite powder in an amount of greater than 0.5% and less than 8%; and a clay powder in an amount of greater than 0.5% and less than 5%.

20. The manufacturing process as claimed in 19, in which one or more of said powder of zirconia stabilized with $Y_2O_3$, corundum powder, silica powder, cordierite powder, and clay powder is/are replaced, at least partially, by equivalent powders which result, in said beads, in the same constituents, in the same amounts, with the same crystallographic phases.

* * * * *